United States Patent
Uchiyama et al.

(10) Patent No.: US 10,033,035 B2
(45) Date of Patent: Jul. 24, 2018

(54) METHOD FOR PRODUCING ACTIVE MATERIAL COMPOSITE PARTICLES

(71) Applicant: TOYOTA JIDOSHA KABUSHIKI KAISHA, Toyota-shi, Aichi-ken (JP)

(72) Inventors: Takayuki Uchiyama, Susono (JP); Masahiro Iwasaki, Susono (JP); Hirokazu Kawaoka, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/017,129

(22) Filed: Feb. 5, 2016

(65) Prior Publication Data
US 2016/0268596 A1    Sep. 15, 2016

(30) Foreign Application Priority Data

Mar. 11, 2015    (JP) .................................. 2015-048236

(51) Int. Cl.
| | |
|---|---|
| *H01M 4/36* | (2006.01) |
| *C23C 16/56* | (2006.01) |
| *H01M 4/485* | (2010.01) |
| *H01M 4/04* | (2006.01) |
| *H01M 4/1391* | (2010.01) |
| *C23C 18/00* | (2006.01) |

(52) U.S. Cl.
CPC ............ *H01M 4/366* (2013.01); *C23C 18/00* (2013.01); *H01M 4/0471* (2013.01); *H01M 4/1391* (2013.01); *H01M 4/485* (2013.01)

(58) Field of Classification Search
CPC ....................................................... C23C 16/56
See application file for complete search history.

(56) References Cited

U.S. PATENT DOCUMENTS

| | | | |
|---|---|---|---|
| 2004/0018430 A1* | 1/2004 | Holman | ................. H01G 11/48 |
| | | | 429/233 |
| 2006/0003245 A1* | 1/2006 | Ohwada | ............... G03G 9/0821 |
| | | | 430/108.3 |
| 2009/0017384 A1 | 1/2009 | Iwasaki et al. | |
| 2009/0081554 A1 | 3/2009 | Takada et al. | |
| 2011/0027661 A1 | 2/2011 | Okazaki et al. | |
| 2013/0059209 A1 | 3/2013 | Ota et al. | |
| | | (Continued) | |

FOREIGN PATENT DOCUMENTS

| | | |
|---|---|---|
| JP | 2009-193940 A | 8/2009 |
| JP | 2012074240 A | 4/2012 |
| | (Continued) | |

*Primary Examiner* — Dah Wei D Yuan
*Assistant Examiner* — Kristen A Dagenais
(74) *Attorney, Agent, or Firm* — Oliff PLC

(57) ABSTRACT

An object of the present invention is to provide a method for producing active material composite particles having a dense coating layer. In the present invention, the above object is achieved by providing a method for producing an active material composite particle, the method comprising steps of: a coating step of coating a surface of an active material with a precursor solution of a Li ion conductive oxide to form a precursor layer; a heat treatment step of performing heat treatment on the precursor layer to form a coating layer comprising the Li ion conductive oxide; and a compression shearing treatment step of performing compression shearing treatment on the coating layer.

7 Claims, 3 Drawing Sheets

(56) References Cited

U.S. PATENT DOCUMENTS

2013/0130113 A1* 5/2013 Takano ................ H01M 4/131
                                                                           429/223
2013/0209890 A1* 8/2013 Nagatomi ............. C01G 33/00
                                                                          429/231.5

FOREIGN PATENT DOCUMENTS

| | | |
|---|---|---|
| JP | 2015056307 A | 3/2015 |
| WO | 2007/004590 A1 | 1/2007 |
| WO | 2011/145462 A1 | 11/2011 |

* cited by examiner

METHOD FOR PRODUCING ACTIVE MATERIAL COMPOSITE PARTICLES

TECHNICAL FIELD

The present invention relates to a method for producing active material composite particles having a dense coating layer.

BACKGROUND ART

In the field of all solid state batteries, attention has been paid to the interface of an active material and a solid electrolyte material, and there have been attempts to promote an enhancement in the performance of batteries. For example, Patent Literature 1 discloses an all solid lithium battery including a lithium ion conductive solid electrolyte having a sulfide as a main component and a cathode active material having a surface coated with a lithium ion conductive oxide. Further, as an example of the lithium ion conductive oxide, $LiNbO_3$ is disclosed. Furthermore, as an example of a method for forming a lithium ion conductive oxide, a method of using a solution containing a metal alkoxide is disclosed.

Furthermore, Patent Literature 2 discloses a lithium-transition metal oxide powder having a surface coated with a coating layer containing lithium niobate and the lithium-transition metal oxide powder having a carbon content of 0.03% by mass or less. Furthermore, as an example of a method for forming lithium niobate, a method of using a solution containing a peroxo complex of niobium acid is disclosed.

CITATION LIST

Patent Literatures

Patent Literature 1: WO 2007/004590
Patent Literature 2: Japanese Patent Application Laid-Open (JP-A) No. 2012-074240

SUMMARY OF INVENTION

Technical Problem

Patent Literatures 1 and 2 describe forming of a coating layer comprising a Li ion conductive oxide on a surface of an active material by using a precursor solution of a Li ion conductive oxide. In general, since the thickness of the coating layer is extremely thin, the evaluation method thereof is limited and there are a lot of unclear points on the state of the coating layer. The present inventors fully examined the coating layer prepared by using the precursor solution, and they attained the finding that a sufficiently dense coating layer is not formed.

The present invention has been made in a nod to the above-described circumstances, and a main object thereof is to provide a method for producing active material composite particles having a dense coating layer.

Solution to Problem

In order to achieve the above object, the present invention provides a method for producing an active material composite particle, the method comprising steps of: a coating step of coating a surface of an active material with a precursor solution of a Li ion conductive oxide to form a precursor layer; a heat treatment step of performing heat treatment on the precursor layer to form a coating layer comprising the Li ion conductive oxide; and a compression shearing treatment step of performing compression shearing treatment on the coating layer.

According to the present invention, the active material composite particle having a dense coating layer can be obtained by performing the compression shearing treatment after the heat treatment step.

In the above-described invention, it is preferable that the precursor solution contains a metal alkoxide or a metal peroxo complex.

In the above-described invention, it is preferable that the Li ion conductive oxide is lithium niobate, and a compression shearing energy in the compression shearing treatment step is in the range of 0.38 Wh/g to 4.86 Wh/g.

In the above-described invention, it is preferable that a main component of a solvent of the precursor solution is water, and a heat treatment temperature in the heat treatment step is 200° C. or higher.

Advantageous Effects of Invention

The present invention exhibits an effect capable of obtaining active material composite particles having a dense coating layer.

DESCRIPTION OF EMBODIMENTS

Hereinafter, a method for producing active material composite particles of the present invention will be described in detail.

Figure 1A:
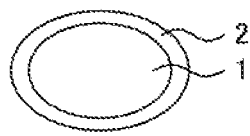
FIGS. 1A to 1C are schematic sectional views illustrating an example of a method for producing active material composite particles of the present invention.
Figure 1B:
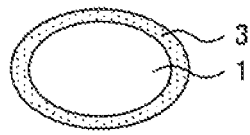
Figure 1C:
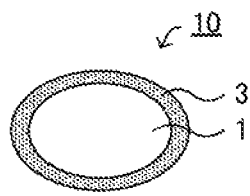
Figure 2:
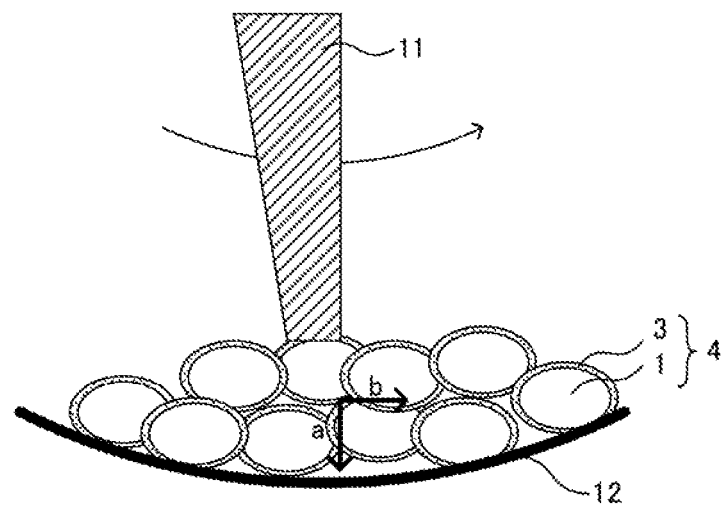
FIG. 2 is a schematic sectional view illustrating an example of compression shearing treatment in the present invention.

FIGS. 1A to 1C are schematic sectional views illustrating an example of a method for producing active material composite particles of the present invention. In FIGS. 1A to 1C, first, a surface of an active material 1 is coated with a precursor solution of a Li ion conductive oxide to form a precursor layer 2 (FIG. 1A). Next, the precursor layer 2 is subjected to heat treatment to form a coating layer 3 comprising the Li ion conductive oxide (FIG. 1B). Then, the coating layer 3 is subjected to compression shearing treatment to obtain active material composite particles 10 (FIG. 1C). Furthermore, FIG. 2 is a schematic sectional view illustrating an example of compression shearing treatment in the present invention. In FIG. 2, when a blade 11 is rotated, the compression shearing energy is applied to particles 4 present between the blade 11 and a vessel 12. Specifically, compression energy "a" is applied to the normal direction of the rotation of the blade 11, and shearing energy "b" is applied to the tangential direction of the rotation of the blade 11.

According to the present invention, it is possible to obtain active material composite particles having a dense coating layer by performing the compression shearing treatment after the heat treatment step. As described above, the coating layer prepared by using a precursor solution has low denseness. The reason for this is speculated that the solvent of the precursor solution is evaporated in the heat treatment step and generates a pore (void) in the coating layer. Although there is a possibility that the pore (gas generation amount) can be decreased to some extent by selection of a material of the precursor solution, there is limitation on that the denseness of the coating layer is sufficiently increased. On the other hand, in the present invention, since the compression shearing treatment is performed after the heat treatment step, the denseness of the coating layer can be sufficiently increased. When the coating layer is densified, there is an advantage that the Li ion conduction in the coating layer becomes smooth and thus the reaction resistance is decreased.

Hereinafter, the method for producing active material composite particles of the present invention will be described in each step.

1. Coating Step

The coating step in the present invention is a step of coating a surface of an active material with a precursor solution of a Li ion conductive oxide to form a precursor layer.

(1) Precursor Solution

The precursor solution in the present invention generally contains a raw material/raw materials of a Li ion conductive oxide and a solvent. The kind of the Li ion conductive oxide is not particularly limited, but examples thereof may include $LiNbO_3$, $LiAlO_2$, $Li_4SiO_4$, $Li_2SiO_3$, $Li_2TiO_3$, $Li_4Ti_5O_{12}$, $Li_2Ti_2O_5$, $Li_2ZrO_3$, $Li_2MoO_4$, and $Li_2WO_4$.

Examples of the raw material of a Li ion conductive oxide may include a metal alkoxide, a metal inorganic salt, a metal hydroxide, and a metal complex. Examples of the metal inorganic salt may include metal nitrate, metal sulfate, and metal acetate. Examples of the metal complex may include a metal acid complex, and specific examples thereof may include a peroxo complex of a metal and an oxalato complex of metal.

The precursor solution generally contains a Li source of the Li ion conductive oxide. Examples of the Li source may include a Li alkoxide, a Li inorganic salt, and a Li hydroxide. Examples of the Li alkoxide may include ethoxylithium and methoxylithium. Examples of the Li inorganic salt may include lithium nitrate, lithium sulfate, and lithium acetate. Examples of the Li hydroxide may include lithium hydroxide.

The precursor solution may contain a metal source other than Li. As an example of the metal source other than Li, Nb is exemplified. Examples of an Nb source may include an Nb alkoxide, an Nb inorganic salt, an Nb hydroxide, and an Nb complex. Examples of the Nb alkoxide may include pentaethoxyniobium, pentamethoxyniobium, penta-i-propoxyniobium, penta-n-propoxyniobium, penta-i-butoxyniobium, penta-n-butoxyniobium, and penta-sec-butoxyniobium. Examples of the Nb inorganic salt may include niobium acetate. Examples of the Nb hydroxide may include niobium hydroxyde. Examples of the Nb complex may include a peroxo complex of Nb (peroxoniobium acid complex, $[Nb(O_2)_4]^{3-}$).

When the precursor solution contains the metal alkoxide, in general, the precursor layer is formed by a sol-gel method. In this case, the metal alkoxide becomes a sol state through hydrolysis reaction and polycondensation reaction. Further, the metal alkoxide becomes a gel state through polycondensation reaction and aggregation.

The precursor solution containing a peroxo complex of a metal has an advantage that a gas generation amount is smaller than that of a precursor solution containing a metal alkoxide. As a method for preparing the precursor solution containing a peroxo complex of a metal, for example, a method can be exemplified in which a hydrogen peroxide solution and ammonia water are added to a metal oxide. The addition amount of the hydrogen peroxide solution and the ammonia water may be appropriately adjusted such that a transparent solution (homogeneous solution) can be obtained.

The kind of the solvent of the precursor solution is not particularly limited, but examples thereof may include alcohols and water. Examples of the alcohols may include methanol, ethanol, propanol, and butanol. The main component of the solvent of the precursor solution may be alcohols. The ratio of the alcohol in the solvent is preferably 50 mol % or more, and may be 70 mol % or more or 90 mol % or more. The main component of the solvent of the precursor solution may be water. The ratio of the water in the solvent is preferably 50 mol % or more, and may be 70 mol % or more or 90 mol % or more.

For example, when the precursor solution contains the metal alkoxide, the solvent is preferably anhydrous or dehydrated alcohols. On the other hand, for example, when the precursor solution contains the peroxo complex of a metal, the solvent is preferably water.

(2) Active Material

Examples of the active material in the present invention include lithium cobaltate ($LiCoO_2$), lithium nickelate ($LiNiO_2$), $LiNi_{1/3}Mn_{1/3}Co_{1/3}O_2$, lithium manganate ($LiMn_2O_4$), heteroelement-substituted Li—Mn spinal represented by $Li_{1+x}Mn_{2-x-y}M_yO_4$ ($0 \leq x$, $0 < y$, $x+y<2$, M=at least one selected from Al, Mg, Co, Fe, Ni, and Zn), lithium titanate (oxide containing Li and Ti), lithium metal phosphate ($LiMPO_4$, M=at least one selected from Fe, Mn, Co, and Ni), transition metal oxides (for example, vanadium oxide ($V_2O_5$) and molybdenum oxide ($MoO_3$)), titanium sulfide ($TiS_2$), carbon materials (for example, graphite and hard carbon), lithium cobalt nitride (LiCoN), lithium silicon oxide (oxide containing Li and Si), lithium metal (Li), lithium alloys (for example, LiM; M=Sn, Si, Al, Ge, Sb, P), lithium storable intermetallic compounds (for example, storable intermetallic compounds containing Mg and M; M=Sn, Ge, Sb, and storable intermetallic compounds containing N and Sb; N=In, Cu, Mn), and derivatives thereof.

Among them, the active material in the present invention is preferably an oxide active material. The reason for this is that the oxide active material generally has high capacity. Furthermore, since the oxide active material easily reacts with a sulfide solid electrolyte material, it is possible to effectively suppress the reaction between them by providing the coating layer.

The shape of the active material is not particularly limited, but examples thereof may include a spherical shape. The average particle diameter ($D_{50}$) of the active material is, for example, 1 nm or more, and may be 10 nm or more or 100 nm or more. On the other hand, the average particle diameter ($D_{50}$) of the active material is, for example, 50 μm or less, and may be 20 µm or less. Furthermore, the active material may be used as a cathode active material or an anode active material.

(3) Coating Method

The method of coating the surface of the active material with the precursor solution is not particularly limited as long as it is a method by which a desired precursor layer can be obtained. As an example of the coating method, a method can be exemplified in which coating of an active material with a precursor solution and drying of the coated precursor solution are performed at the same time. Examples of such a coating method may include a fluidized bed coating method and a spray dryer method.

In the fluidized bed coating method, by performing coating of an active material with a precursor solution and drying of the coated precursor solution at the same time (coating and drying are repeated in a microscopic view), it is possible to form a uniform precursor layer. Specifically, the coated precursor solution is dried by means of an air stream in a fluidized bed vessel while the coating of the precursor solution is performed at the same time. The air stream temperature (gas stream temperature) is, for example, in the range of 40° C. to 100° C. Examples of a fluidized bed coating apparatus may include MULTIPLEX COATER™ manufactured by Powrex Corporation and FLOW COATER™ manufactured by Freund Corporation.

In particular, when the precursor solution contains hydrogen peroxide, the fluidized bed coating method is effective. Since the hydrogen peroxide has strong oxidizing properties, when the precursor solution is brought into contact with the active material for a long time, there is a possibility that the active material deteriorates. By performing coating and drying at the same time, it is possible to suppress the deterioration of the active material caused by hydrogen peroxide.

As other coating methods, a method can be exemplified in which the active material is immersed in the precursor solution, and then the solvent is dried.

2. Heat Treatment Step

The heat treatment step in the present invention is a step of performing heat treatment on the precursor layer to form a coating layer comprising the Li ion conductive oxide.

The heat treatment temperature is not particularly limited as long as it is a temperature at which a target coating layer can be formed, but the heat treatment temperature is, for example, 100° C. or higher, preferably 150° C. or higher, and more preferably 200° C. or higher. On the other hand, the heat treatment temperature is, for example, 500° C. or lower and preferably 400° C. or lower. When water is used as a main component of the solvent of the precursor solution, the heat treatment temperature is preferably 200° C. or higher. The reason for this is that the reaction resistance can be decreased considerably.

The heat treatment time is appropriately set such that a target coating layer can be formed. The heat treatment time is, for example, in the range of 30 minutes to 48 hours and preferably in the range of 1 hour to 20 hours. Furthermore, the heat treatment atmosphere is, for example, preferably an atmosphere containing oxygen. The reason for this is that, when oxygen is present, it is easy to form a Li ion conductive oxide. As the atmosphere containing oxygen, for example, an air atmosphere can be exemplified. Furthermore, as a heat treatment method, for example, a method of using a burning furnace can be exemplified. As the burning furnace, for example, a muffle furnace can be exemplified.

3. Compression Shearing Treatment Step

The compression shearing treatment step in the present invention is a step of performing compression shearing treatment on the coating layer. By performing the compression shearing treatment, the coating layer is densified.

In the present invention, it is preferable that the BET specific surface area of the active material composite particles be decreased by the compression shearing treatment. When the BET specific surface area of the particles after the compression shearing treatment is designated as $S_1$ and the BET specific surface area of the particles before the compression shearing treatment is designated as $S_2$, $S_1/S_2$ is, for example, 0.95 or less and preferably 0.90 or less. On the other hand, the lower limit of $S_1/S_2$ is not particularly limited. Furthermore, when the Li ion conductive oxide is lithium niobate, the BET specific surface area of the active material composite particles is, for example, preferably in the range of 0.9 $m^2/g$ to 1.1 $m^2/g$ or less.

Furthermore, the compression shearing treatment is preferably a treatment by which the average particle diameter of the active material composite particles is not changed. The reason for this is that the compression shearing energy can be applied to the coating layer without pulverizing or aggregating the active material composite particles. The expression "treatment by which the average particle diameter of the active material composite particles is not changed" indicates that an average particle diameter x ($D_{50}$) of the particles after the compression shearing treatment is in the range of ±10% of an average particle diameter y ($D_{50}$) of the particles before the compression shearing treatment. For example, if the average particle diameter "y" is 5 µm, a case where the average particle diameter "x" is in the range of 5±0.5 µm can be said to correspond to the "treatment by which the average particle diameter of the active material composite particles is not changed." The average particle diameter "x" is preferably in the range of ±5% of the average particle diameter "y", and more preferably in the range of ±3% of the average particle diameter "y". Incidentally, regarding $D_{10}$ and $D_{90}$, these matters are also similarly applied thereto.

Furthermore, the compression shearing energy to be applied by the compression shearing treatment is defined as follows.

Compression shearing energy (Wh/g)=motor load ($W$)×treatment time (h)/amount (g) of active material composite particles The compression shearing energy is, for example, 0.1 Wh/g or more and preferably 0.3 Wh/g or more. When the compression shearing energy is too small, there is a possibility that the coating layer cannot be sufficiently densified. On the other hand, the compression shearing energy is, for example, 10 Wh/g or less and preferably 5 Wh/g or less. When the compression shearing energy is too large, there is a possibility that the coating layer is peeled off and the surface of the particles is roughened. Furthermore, when the Li ion conductive oxide is lithium niobate, the compression shearing energy is preferably in the range of 0.38 Wh/g to 4.86 Wh/g.

As the compression shearing treatment, for example, mechanical kneading treatment can be exemplified. The mechanical kneading treatment means treatment in which the compression shearing energy is applied by a mechanical means. As an example of the mechanical kneading treatment, a treatment can be exemplified in which the compression shearing energy is applied by a crushing medium. Examples of the crushing medium may include a blade, a bead, and a ball. In this case, the crushing medium may be moved actively, or the crushing medium may be moved passively. As a specific example of the former, a treatment can be exemplified in which the blade 11 is rotated by a rotor or the like, as illustrated in FIG. 2. As a specific example of the latter, a method can be exemplified in which a ball for crushing is put into a vessel and the vessel is rotated and revolved. Other examples of the mechanical kneading treatment may include a method in which the vessel is rotated and revolved without using a crushing medium and a method in which particles are dispersed in high-speed air stream.

Examples of a compression shearing treatment apparatus may include a mechanofusion system and a hybridization system. Specifically, Nobilta NOB™ (manufactured by HOSOKAWA MICRON CORPORATION), COMPOSI™ (manufactured by NIPPON COKE & ENGINEERING COMPANY, LIMITED) can be exemplified as the compression shearing treatment apparatus.

4. Active Material Composite Particles

The active material composite particles obtained by the present invention comprise an active material and a coating layer that is formed on the active material and comprising a Li ion conductive oxide. The coating layer is densified by the compression shearing treatment.

The average thickness of the coating layer is, for example, in the range of 1 nm to 100 nm and preferably in the range of 1 nm to 50 nm. The average thickness of the coating layer can be measured by, for example, observation with a transmission electron microscope (TEM) (for example, n≥100). Furthermore, a higher coating rate of the coating layer is preferable. Specifically, the coating rate is preferably 50% or more and more preferably 80% or more. Furthermore, the coating rate of the coating layer may be 100%. The coating rate of the coating layer can be measured by using, for example, a transmission electron microscope (TEM) or an X-ray photoelectron spectrometry (XPS).

The average particle diameter ($D_{50}$) of the active material composite particles is, for example, 1 nm or more, and may be 10 nm or more or 100 nm or more. On the other hand, the average particle diameter ($D_{50}$) of the active material composite particles is, for example, 50 μm or less, and may be 20 μm or less.

The active material composite particles are used in, for example, an all solid lithium battery. Furthermore, the active material composite particles are preferably used in a state where the active material composite particles come in contact with a sulfide solid electrolyte material. Examples of the sulfide solid electrolyte material may include $Li_2S$—$P_2S_5$, $Li_2S$—$P_2S_5$—$LiI$, $Li_2S$—$P_2S_5$—$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ (provided that m and n are each a positive number, and Z is any one of Ge, Zn, and Ga), $Li_2S$—$GeS_2$, $Li_2S$—$SiS_2$—$Li_3PO_4$, and $Li_2S$—$SiS_2$—$Li_xMO_y$ (provided that x and y are each a positive number, and M is any one of P, Si, Ge, B, Al, Ga, and In). Incidentally, the description "$Li_2S$—$P_2S_5$" means a sulfide solid electrolyte material formed by using a raw material composition containing $Li_2S$ and $P_2S_5$, and the same is applied to the other descriptions. The sulfide solid electrolyte material may be non-crystalline or crystalline.

Furthermore, in the present invention, it is possible to provide a method for producing an all solid lithium battery using active material composite particles. That is, it is also possible to provide a method for producing an all solid lithium battery, the all solid lithium battery comprises a cathode active material layer containing a cathode active material, an anode active material layer containing an anode active material, and a solid electrolyte layer formed between the cathode active material layer and the anode active material layer, characterized in that the method comprises an active material preparing step of preparing active material composite particles through the above-described each step, and the active material composite particles are used as the cathode active material or the anode active material.

Among them, the active material composite particles are preferably used as the cathode active material. Furthermore, the active material composite particles preferably come in contact with the sulfide solid electrolyte material contained in the cathode active material layer or the solid electrolyte layer. Furthermore, the all solid lithium battery may be a primary battery or a secondary battery. In particular, a secondary battery is preferable since the secondary battery can be repeatedly charged and discharged and is useful as, for example, a battery mounted on a vehicle.

Incidentally, the present invention is not limited to the embodiments described above. The above embodiments are merely an exemplification and any of those having substantially the same constitution as the technical spirit described in Claims of the present invention and exhibiting the same working effects as those is included in the technical scope of the present invention.

EXAMPLES

Hereinafter, the present invention will be described in more detail by means of Examples.

Example 1

(Preparation of Precursor Solution)

Added to a vessel were 987.4 g of ion-exchange water and 44.2 g of niobium acid (niobium hydroxide, $Nb_2O_5.3H_2O$ ($Nb_2O_5$ content rate of 72%)), and 870.4 g of hydrogen peroxide solution having a concentration of 30% by mass has been added thereto. Subsequently, 87.9 g of ammonia water having a concentration of 28% by mass was added to the vessel. Then, after the ammonia water was added, stirring was sufficiently performed to thereby obtain a transparent solution. Further, 10.1 g of lithium hydroxide.monohydrate ($LiOH.H_2O$) was added to the obtained transparent solution to thereby obtain a precursor solution containing a peroxo complex of niobium and lithium. The molar concentration of each of Li and Nb in the obtained precursor solution was 0.12 mol/kg.

(Coating and Heat Treatment)

Sprayed was 2,000 g of the precursor solution prepared above to 1 kg of a cathode active material $LiNi_{1/3}Mn_{1/3}Co_{1/3}O_2$ using a tumbling-fluidized-bed coating apparatus (MP-01™, manufactured by Powrex Corporation) and then the cathode active material was dried. The operation conditions were set as follows: intake gas: nitrogen, intake temperature: 120° C., amount of intake air: 0.4 m³/h, rotation numbers of rotor: 400 rpm, and a rate of spraying: 4.5 g/min. Accordingly, a precursor layer was formed on the surface of the active material. Thereafter, the precursor layer was subjected to heat treatment in an air atmosphere under the condition of 200° C. for 5 hours to thereby form a coating layer comprising lithium niobate ($LiNbO_3$).

(Compression Shearing Treatment)

The compression shearing treatment was performed on 40 g of the obtained particles using a particle composite apparatus (NOB-MINI™, manufactured by HOSOKAWA MICRON CORPORATION). The operation conditions were set as follows: distance between blade and wall: 1 mm, blade peripheral speed: 8.4 m/sec, and treatment time: 10 min. The compression shearing energy was 0.38 Wh/g. Thus, active material composite particles were obtained.

Example 2

Active material composite particles were obtained in the same manner as in Example 1, except that the blade peripheral speed in the compression shearing treatment was changed to 16.8 m/sec. The compression shearing energy was 1.17 Wh/g.

Example 3

Active material composite particles were obtained in the same manner as in Example 1, except that the blade peripheral speed in the compression shearing treatment was changed to 30.3 m/sec. The compression shearing energy was 4.86 Wh/g.

Comparative Example 1

Active material composite particles were obtained in the same manner as in Example 1, except that the compression shearing treatment was not performed.

[Evaluation]

(Particle Size Distribution Measurement)

The average particle diameter of the active material composite particles obtained in each of Examples 1 to 3 and Comparative Example 1 was obtained. Specifically, the average particle diameter was obtained using a particle size distribution measuring apparatus (Aerotrac SPR7340™, manufactured by NIKKISO CO., LTD.). The results thus obtained are shown in Table 1 and FIG. 3.

(BET Specific Surface Area Measurement)

The BET specific surface area of the active material composite particles obtained in each of Examples 1 to 3 and Comparative Example 1 was measured. Specifically, the BET specific surface area was measured by using a specific surface area measuring apparatus (TriStar 3000™, manufactured by SHIMADZU CORPORATION). The results thus obtained are shown in Table 1 and FIG. 3.

TABLE 1

| | Compression Shearing Energy | Average Particle Diameter [μm] | | | BET Specific Surface Area |
|---|---|---|---|---|---|
| | [Wh/g] | D10 | D50 | D90 | [m²/g] |
| Example 1 | 0.38 | 3.31 | 5.23 | 7.66 | 0.924 |
| Example 2 | 1.17 | 3.30 | 5.24 | 7.70 | 0.929 |
| Example 3 | 4.86 | 3.26 | 5.10 | 7.47 | 1.039 |
| Comparative Example 1 | 0 | 3.38 | 5.32 | 7.70 | 1.170 |

Figure 3:
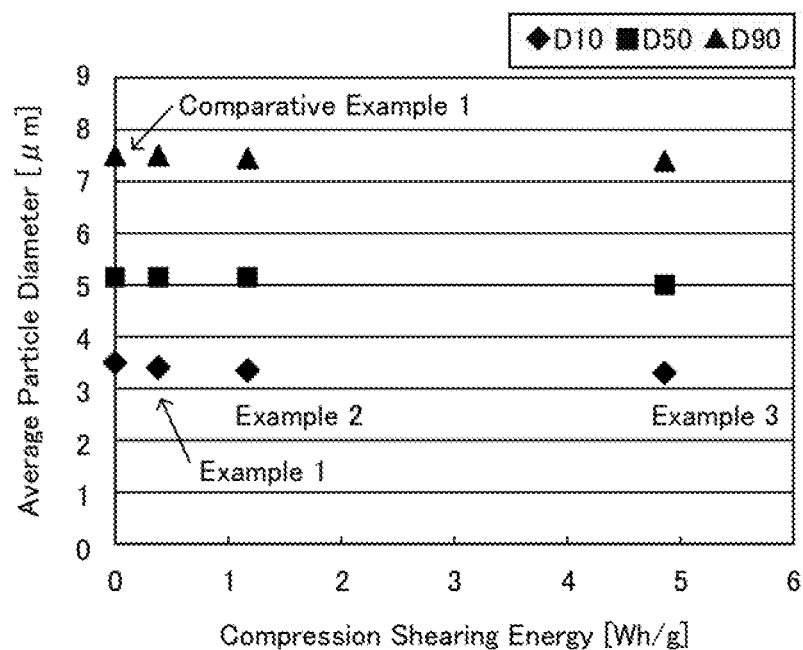
FIG. 3 shows the result of particle size distribution measurements of active material composite particles obtained in each of Examples 1 to 3 and Comparative Example 1.
Figure 4:
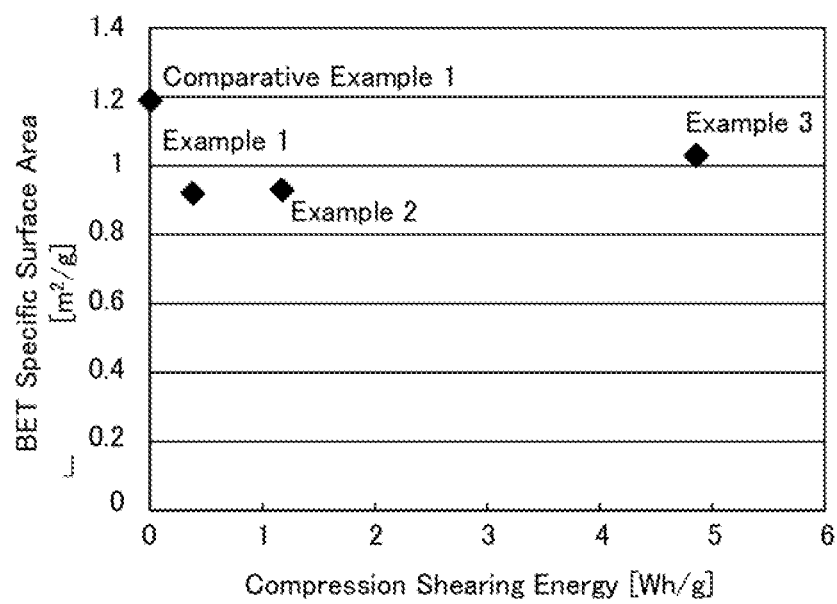
FIG. 4 shows the result of BET specific surface area measurements of active material composite particles obtained in each of Examples 1 to 3 and Comparative Example 1.

As shown in Table 1 and FIG. 3, it was confirmed that pulverization and aggregation of the active material composite particles did not occur in the compression shearing treatments in Examples 1 to 3. Furthermore, as shown in Table 1 and FIG. 4, the BET specific surface area was decreased as compared to Comparative Example 1 and densification could be achieved by performing the compression shearing treatment in Examples 1 to 3.

Reference Example 1

A precursor layer was formed in the same manner as in Example 1. Thereafter, the precursor layer was subjected to heat treatment in an air atmosphere under the condition of 200° C. for 5 hours to thereby form a coating layer comprising lithium niobate. Thus, active material composite particles were obtained.

A battery for evaluation was prepared by using the obtained active material composite particles. First, the active material composite particles and the sulfide solid electrolyte material ($Li_3PS_4$) were weighed such that the volume ratio became active material composite particles:sulfide solid electrolyte material=6:4, and then they were put into a vessel into which heptane has been introduced. Further, 3% by mass of a conduction aid (vapor growth carbon fiber, manufactured by Showa Denko K.K.) and 3% by mass of a binder (butylene rubber, manufactured by JSR Corporation) were put into the vessel to thereby prepare a cathode slurry. Subsequently, a cathode composition obtained by dispersing the cathode slurry with an ultrasonic homogenizer (UH-50™, manufactured by SMT Corporation; hereinafter, the same is applied) was coated on an aluminum foil and the aluminum foil was dried at 100° C. for 30 minutes. Thereafter, the dried aluminum foil was punched into a size of 1 cm² to thereby obtain a cathode.

Next, the anode active material (layered carbon) and the sulfide solid electrolyte material ($Li_3PS_4$) were weighed such that the volume ratio became anode active material: sulfide solid electrolyte material=6:4, and then they were put into a vessel into which heptane has been introduced. Further, 1.2% by mass of a binder (butylene rubber, manufactured by JSR Corporation) was put into the vessel to thereby prepare an anode slurry. Subsequently, an anode composition obtained by dispersing the anode slurry with an ultrasonic homogenizer was coated on a copper foil and the copper foil was dried at 100° C. for 30 minutes. Thereafter, the dried copper foil was punched into a size of 1 cm² to thereby obtain an anode.

Next, 64.8 mg of the sulfide solid electrolyte material ($Li_3PS_4$) was put into a tubular ceramic having an internal diameter cross-sectional area of 1 cm², the surface thereof was smoothened, and then pressed at 98 MPa to thereby form a solid electrolyte layer. The cathode and the anode were disposed such that the solid electrolyte layer was interposed therebetween, and then pressed at 421.4 MPa. Thereafter, a stainless steel rod was put in each of the cathode side and the anode side, and confined at 98 MPa to thereby obtain a battery for evaluation.

Reference Examples 2 and 3

Active material composite particles were obtained in the same manner as in Reference Example 1, except that the heat treatment temperature was changed from 200° C. to 250° C. and 300° C. A battery for evaluation was obtained in the same manner as in Reference Example 1, except that the obtained active material composite particles were used.

[Evaluation]

(BET Specific Surface Area)

The BET specific surface area of the active material composite particles obtained in each of Reference Examples 1 to 3 was measured. The measurement method is as described above.

(Reaction Resistance Measurement)

The reaction resistance of the battery for evaluation obtained in each of Reference Examples 1 to 3 was measured. First, the battery for evaluation was charged to a voltage of 4.5 V and then discharged to 2.5 V. Thereafter, the alternating-current impedance measurement was performed at 3.6 V. Then, the reaction resistance [Ω·cm²] was specified from the circular arc obtained by Nyquist plot. The results thus obtained are shown in Table 2 and FIG. 5.

TABLE 2

|  | BET Specific Surface Area [m²/g] | Reaction Resistance [Ω·cm²] |
|---|---|---|
| Reference Example 1 | 1.17 | 2.64 |
| Reference Example 2 | 1.18 | 2.84 |
| Reference Example 3 | 1.34 | 4.06 |

Figure 5:
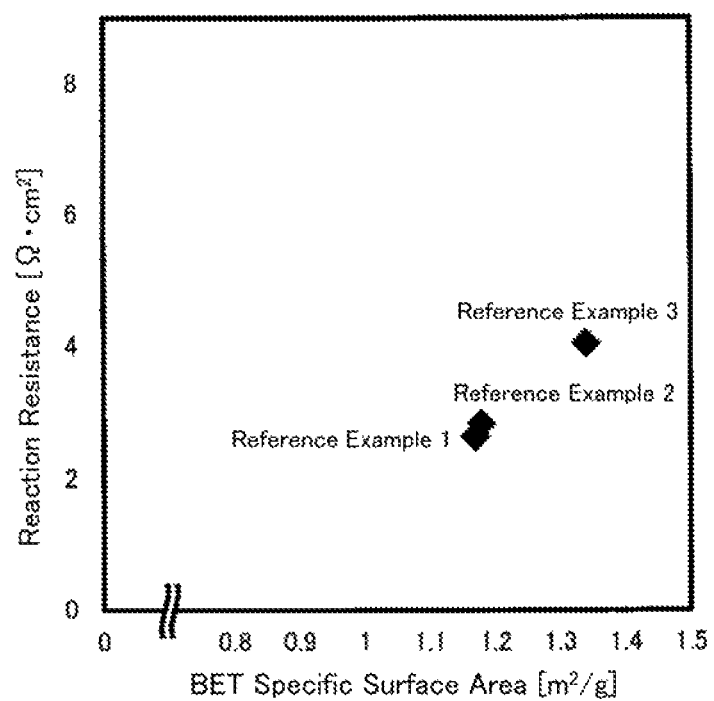
FIG. 5 shows the result of reaction resistance measurements of a battery for evaluation obtained in each of Reference Examples 1 to 3.

As shown in Table 2 and FIG. 5, it was confirmed that the BET specific surface area and the reaction resistance were correlated, and as the BET specific surface area was decreased, the reaction resistance also tended to be decreased. Incidentally, although not illustrated in the drawings, when the heat treatment temperature was changed from 200° C. to 150° C., the reaction resistance became 6.48 Ω·cm², which was considerably increased as compared to Reference Example 1. The reason for this is considered that the heat treatment temperature was low and a large amount of the solvent and impurities remained.

REFERENCE SIGNS LIST

1 Active material
2 Precursor layer
3 Coating layer
10 Active material composite particles
11 Blade
12 Vessel

What is claimed is:

1. A method for producing an active material composite particle, the method comprising steps of:
   a coating step of coating a surface of an active material with a precursor solution of a Li ion conductive oxide to form a precursor layer;
   following the coating step, a heat treatment step of performing heat treatment on the precursor layer to form a coating layer comprising the Li ion conductive oxide and having an average thickness in a range of 1 nm to 100 nm to obtain a particle having the coating layer; and
   following the heat treatment step, a compression shearing treatment step of performing compression shearing treatment on the particle having the coating layer, wherein a ratio of a BET surface area of the active material composite particle following the compression shearing treatment (S1) to a BET surface area of the active material composite particle before the compression shearing treatment (S2) is S1/S2≤0.95.

2. The method for producing an active material composite particle according to claim 1, wherein the precursor solution contains a metal alkoxide or a metal peroxo complex.

3. The method for producing an active material composite particle according to claim 1, wherein
   the Li ion conductive oxide is lithium niobate, and
   a compression shearing energy applied by the compression shearing treatment is in the range of 0.38 Wh/g to 4.86 Wh/g.

4. The method for producing an active material composite particle according to claim 1, wherein
   a main component of a solvent of the precursor solution is water, and
   a heat treatment temperature in the heat treatment step is 200° C. or higher.

5. The method for producing an active material composite particle according to claim 1, wherein the coating layer is a coating layer consisting of the Li ion conductive oxide.

6. The method for producing an active material composite particle according to claim 1, wherein the compression shearing treatment is performed on only the particle having the coating layer.

7. The method for producing an active material composite particle according to claim 1, wherein the compression shearing treatment is a treatment by which the average particle diameter of the active material composite particles is not changed.

* * * * *